(12) United States Patent
Danziger et al.

(10) Patent No.: US 10,884,173 B2
(45) Date of Patent: Jan. 5, 2021

(54) NEAR EYE DISPLAY WITH INTERMEDIATE WINDOW

(71) Applicant: Lumus LTD., Ness Ziona (IL)

(72) Inventors: Yochay Danziger, Kfar Vradim (IL); Naamah Levin, Rehovot (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 16/679,346

(22) Filed: Nov. 11, 2019

(65) Prior Publication Data

US 2020/0150330 A1 May 14, 2020

Related U.S. Application Data

(60) Provisional application No. 62/758,592, filed on Nov. 11, 2018.

(51) Int. Cl.
*G02B 6/34* (2006.01)
*F21V 8/00* (2006.01)

(52) U.S. Cl.
CPC ......... *G02B 6/0028* (2013.01); *G02B 6/0038* (2013.01); *G02B 6/0088* (2013.01)

(58) Field of Classification Search
CPC .. G02B 6/0028; G02B 6/0088; G02B 6/0038; G02B 6/34; G02B 27/0172
See application file for complete search history.

(56) References Cited

U.S. PATENT DOCUMENTS

| | | | | |
|---|---|---|---|---|
| 10,302,835 | B2* | 5/2019 | Danziger | G02B 27/0172 |
| 10,684,403 | B2* | 6/2020 | Danziger | G02B 27/10 |
| 2004/0085649 | A1* | 5/2004 | Repetto | G02B 27/0101 359/633 |
| 2010/0067110 | A1* | 3/2010 | Hadad | G02B 5/04 359/485.06 |
| 2016/0282622 | A1* | 9/2016 | Hiraide | G02B 6/00 |
| 2017/0045744 | A1* | 2/2017 | Amitai | G02B 27/283 |

\* cited by examiner

*Primary Examiner* — Ellen E Kim
(74) *Attorney, Agent, or Firm* — Mark M. Friedman

(57) ABSTRACT

A near eye display including: a first optical waveguide having a direction of elongation, at least one pair of parallel faces, and a first coupling-out mechanism; a second optical waveguide having an input aperture, a pair of parallel faces, and a second coupling out-mechanism; an optical coupling between the first optical waveguide and the second waveguide, the optical coupling including at least an air gap configured to enable total internal reflection within the first waveguide, and an interface window, the interface window comprising a transparent optical element with a refractive index substantially the same as a refractive index of the second optical waveguide; and wherein at least a portion of the interface window projects beyond the input aperture of the second optical waveguide such that undesired light exiting the first waveguide is prevented from entering the second waveguide.

17 Claims, 7 Drawing Sheets

PRIOR ART

NEAR EYE DISPLAY WITH INTERMEDIATE WINDOW

TECHNICAL FIELD

The presently disclosed subject matter relates to a near eye display, and, more particularly, to a near eye display with an intermediate interface window.

BACKGROUND

Certain near eye displays and head up displays having 2D expansion of the aperture include two waveguide (or "light guide") sections. The first section expands the aperture in one dimension and the second expands in the orthogonal dimension. A first example is described in U.S. Pat. No. 7,643,214 which employs waveguides which are based on a single pair of parallel surfaces for expansion in each dimension. A further set of examples are shown in FIGS. 22A-22B of PCT/IL2017/051028, (reproduced herein as FIG. 2), where the waveguide of a first dimension of aperture expansion has two mutually orthogonal pairs of parallel surfaces which guides image light through four-fold internal reflection. This figure describes various interface configurations between the two waveguides.

In order to maintain total internal reflection within the first waveguide, some of these configurations are based on an air-gap between the waveguides that need to be sealed. Throughout the remainder of this document, the term "air-gap" is used to refer to air or any other material with a sufficiently low refractive index to preserve TIR within waveguide 10 for a range of angles of image illumination corresponding to an image field of view.

Both waveguides have to be mechanically combined and held firmly in front of the viewer. Furthermore, the interface between the waveguides preferably has a well-defined aperture which performed trimming in order to achieve generally uniform illumination along the waveguide.

GENERAL DESCRIPTION

According to one aspect of the presently disclosed subject matter there is provided a near eye display including: a first optical waveguide having a direction of elongation, at least one pair of parallel faces, and a first coupling-out mechanism; a second optical waveguide having an input aperture having a pair of parallel faces, and a second coupling out-mechanism; an optical coupling between the first optical waveguide and the second waveguide, the optical coupling including at least an air gap configured to enable total internal reflection within the first waveguide and an interface window, the interface window including a transparent optical element with a refractive index substantially the same as a refractive index of the second optical waveguide; and at least one light absorbent element; wherein at least a portion of the interface window projects beyond the input aperture of the second optical waveguide and serves as a structural support for the at least one light absorbent element.

According to another aspect of the presently disclosed subject matter there is provided a near eye display including: a first optical waveguide having a direction of elongation, at least one pair of parallel faces, and a first coupling-out mechanism; a second optical waveguide having an input aperture, a pair of parallel faces, and a second coupling out-mechanism; an optical coupling between the first optical waveguide and the second waveguide, the optical coupling including at least an air gap configured to enable total internal reflection within the first waveguide, and an interface window, the interface window including a transparent optical element with a refractive index substantially the same as a refractive index of the second optical waveguide; and wherein at least a portion of the interface window projects beyond the input aperture of the second optical waveguide such that undesired light exiting the first waveguide is prevented from entering the second waveguide.

According to some aspects, the at least one light absorbent element extends over a portion of the second optical waveguide, preferably in a direction parallel to the third pair of parallel faces.

According to some aspects, the at least one light absorbent element includes a baffle.

According to some aspects, the at least one light absorbent element encapsulates the first optical waveguide. Preferably the at least one light absorbent element includes a cover. Preferably the cover encapsulates the first optical waveguide such that an air gap remains between the faces of the first optical waveguide and the cover. Preferably the cover is configured to prevent ingress of dirt and humidity into the air gap.

According to some aspects, the at least one light absorbent element includes each of a cover encapsulating the first optical waveguide, and a baffle extending over a portion of the second optical waveguide.

According to some aspects, the interface window is thicker at one end. Preferably, the interface window is coated with a light absorbent coating at one or both ends.

According to some aspects, the second optical waveguide is coated with a reflective coating at a trimming point of the second optical waveguide.

According to some aspects, the first coupling-out mechanism includes a plurality of internal partially reflecting surfaces at least partially traversing the first optical waveguide at an oblique angle to the direction of elongation, or one or more diffractive elements.

According to some aspects, the second coupling-out mechanism includes a plurality of partially reflecting surfaces at least partially traversing the second optical waveguide at an oblique angle to the pair of parallel faces of the second optical waveguide, or one or more diffractive elements.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

The term "near eye display" as used throughout the description should be understood to include other forms of displays that require image expansion, including for example heads up displays.

Figure 1A:
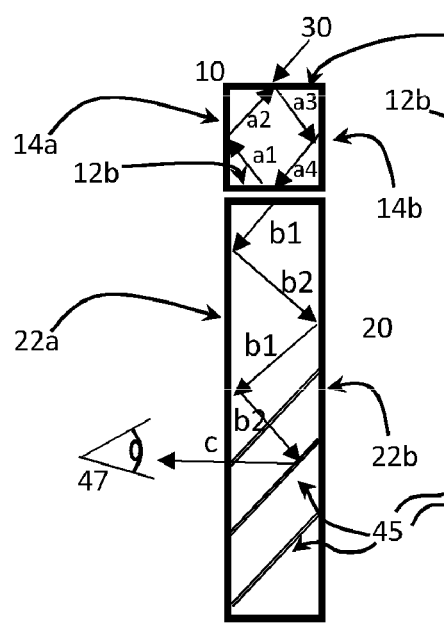
FIGS. 1A-1B illustrate a generalized optical aperture multiplier according to the prior art.
Figure 1B:
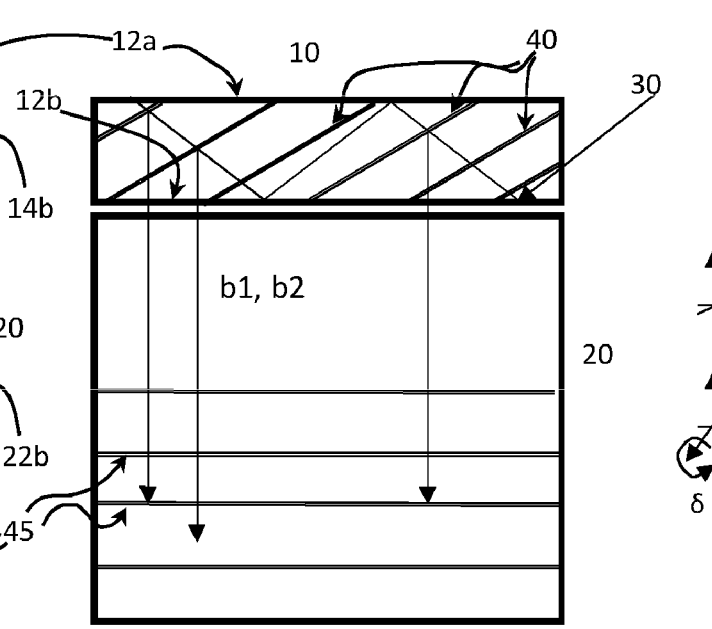

PCT/IL2017/051028, incorporated by reference herein, describes various embodiments of an optical aperture multiplier, shown generally in FIGS. 1A-1B. The optical aperture multiplier includes a first optical waveguide 10 having a direction of elongation illustrated arbitrarily herein as corresponding to the "x-axis". First optical waveguide 10 has first and second pairs of parallel faces 12a, 12b, 14a, 14b forming a rectangular cross-section. According to certain particularly preferred embodiments of the present invention, a plurality of internal partially reflecting surfaces 40, referred to herein as "facets", at least partially traverse first optical waveguide 10 at an oblique angle (i.e., neither parallel nor perpendicular) to the direction of elongation.

The optical aperture multiplier preferably also includes a second optical waveguide 20, optically coupled with first optical waveguide 10, having a third pair of parallel faces 22a, 22b forming a slab-type waveguide, i.e., where the other two dimensions of waveguide 20 are at least an order of magnitude greater than the distance between third pair of parallel faces 22a, 22b. Here too, a plurality of partially reflecting surfaces 45 preferably at least partially traverse second optical waveguide 20 at an oblique angle to the third pair of parallel faces.

The optical coupling between the waveguides, and the deployment and configuration of partially reflecting surfaces 40, 45 are such that, when an image is coupled into first optical waveguide 10 with an initial direction 30 of propagation at a coupling angle oblique to both the first and second pairs of parallel faces 12a, 12b, 14a, 14b, the image advances by four-fold internal reflection (images a1, a2, a3 and a4) along first optical waveguide 10, with a proportion of intensity of the image reflected at partially reflecting surfaces 40 so as to be coupled into second optical waveguide 20, and then propagates through two-fold reflection (images b1, b2) within second optical waveguide 20, with a proportion of intensity of the image reflected at partially reflecting surfaces 45 so as to be directed outwards from one of the parallel faces as a visible image c, seen by the eye of a user 47.

Figure 2:
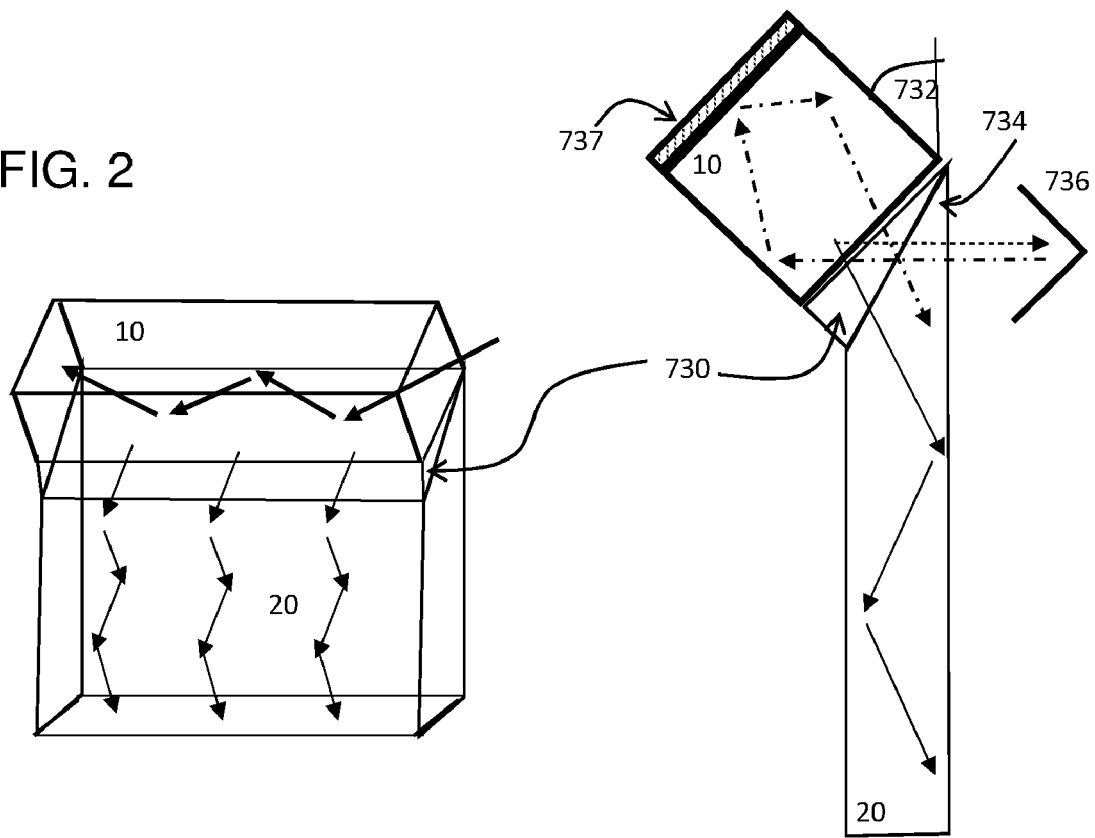
FIG. 2 illustrates a particular embodiment of an optical aperture multiplier according to the prior art.

PCT/IL2017/051028 further describes a particular embodiment of the optical aperture multiplier in which the waveguide 10 is inclined with respect to waveguide 20, as shown in FIG. 2. First waveguide 10 may be mounted at a required inclination relative to ID waveguide 20 by use of an intermediate transparent wedge 730. This inclination is chosen so as to couple one image from waveguide 10 (solid arrow) and not to couple the other image from waveguide 10 (dashed arrow). The inclination of waveguide 10 relative to waveguide 20 can be chosen according to the required angles of the waveguides and the images propagating between them, and may employ a transparent wedge coupling prism 730 to either decrease the inclination relative to an inclined coupling surface of second waveguide 20. Alternatively, the required inclination angle of first waveguide 10 relative to second waveguide 20 matches the angle of the second waveguide coupling surface, so that no intermediate coupling prism is needed.

Figures 3A, 3B:
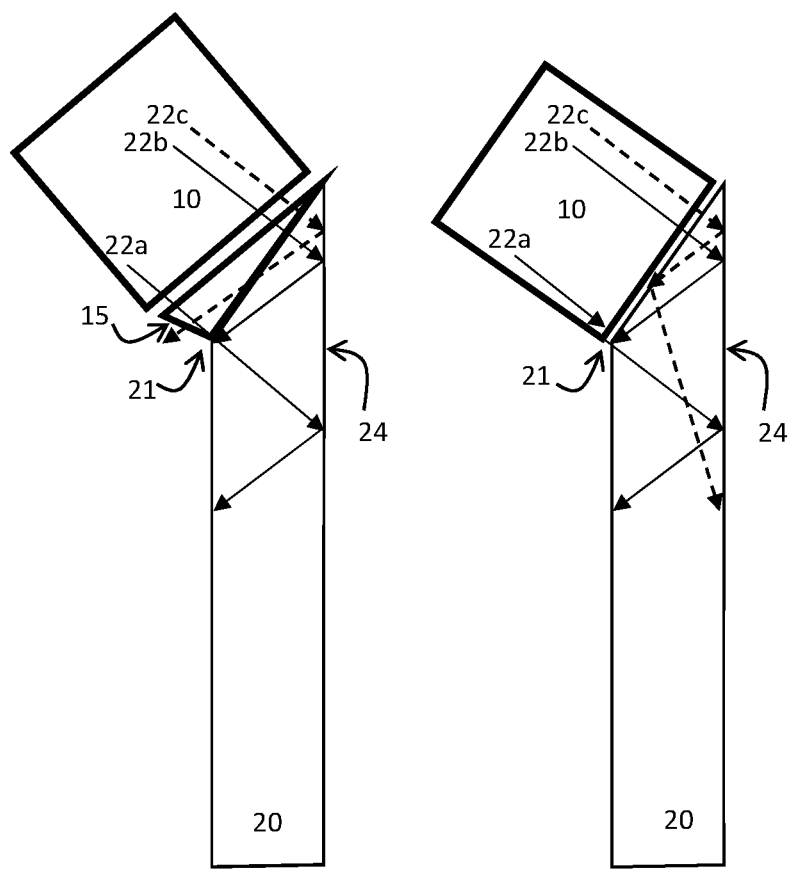
FIGS. 3A-3B illustrate schematic diagrams of a near eye display according to the prior art.

However, in the prior art configurations, in some cases light can be reflected back into waveguide 10 causing image degradation, as shown in FIGS. 3A-3B illustrating a generalized schematic diagram of a near eye display according to the prior art. In FIG. 3A, light is coupled out of a first waveguide 10, for example a 2D waveguide, through an air gap, through prism 15 and into the second waveguide 20, for example a 1D waveguide. Trimming point 21 of waveguide 20 serves as the aperture that trims unrequired light (typically positioned at a corner of waveguide 20). That is, any light rays hitting a point to the right of point 21 will reflect out of waveguide 20.

As illustrated in FIG. 3A, parallel light rays 22a, 22b and 22c represent a single point in the transmitted FOV of an image collimated to infinity. Ray 22a enters waveguide 20 near trimming point 21 and propagates through waveguide 20 via TIR. Ray 22b reflects off of the face 22b of waveguide 20 and is reflected back at a point to the left of point 21 and continues propagating through waveguide 20 via TIR. However, ray 22c also reflected off of face 22b hits a point to the right of point 21 and therefore exits the waveguide 20 via the prism 15.

FIG. 3B illustrates an alternative prior art configuration of a near eye display in which the angular design of the waveguides dictates no "wedge" prism between waveguides 10 and 20. In this case, ray 22c can impinge on the air-gap face at a shallow angle and consequently reflect back into waveguide 20 as undesired light. This undesired light can cause image degradation.

It should be noted that although FIGS. 3A-3B show waveguide 10 as a 2D waveguide with two pairs of parallel faces, the problem of undesired light entering waveguide 20 is equally applicable when waveguide 10 is a 1D waveguide with one pair of parallel faces, such as the waveguides described in U.S. Pat. No. 7,643,214 (see particularly, e.g. FIGS. 10-15, 17, 18 and 20) which is incorporated by reference herein.

Figures 4A, 4B:
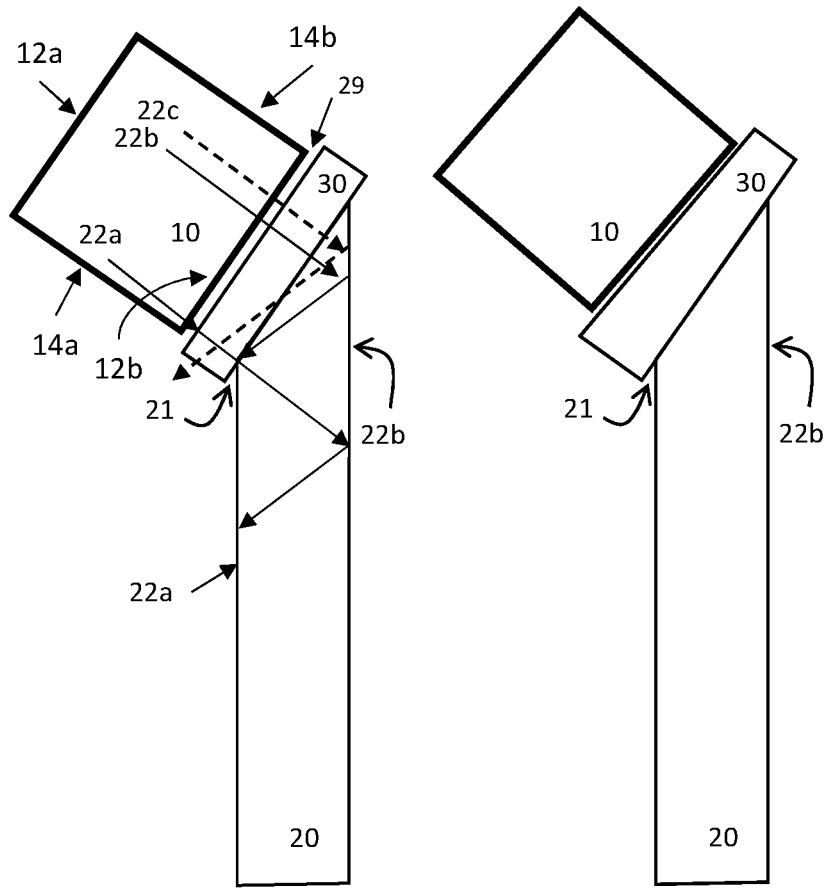
FIGS. 4A-4B illustrate generalized schematic diagrams of a near eye display according to a first embodiment of the present invention.

Turning now to the present invention, a near eye display is provided that improves upon the near eye displays of the prior art. FIGS. 4A-4B illustrate a generalized schematic diagram of a near eye display according to certain embodiments of the presently disclosed subject matter. According to one embodiment of the present invention, the near eye display includes a first optical waveguide 10, a second optical waveguide 20, and an optical coupling between waveguide 10 and waveguide 20 consisting of an air gap 29 and an intermediate interface window 30.

As in the prior art, waveguide 10 has a direction of elongation, at least one pair of parallel faces 12a, 12b, and a coupling-out mechanism 40. In some embodiments, waveguide 10 can have two pairs of parallel faces 12a, 12b, 14a, 14b. In some embodiments, and as shown in FIG. 1B, the coupling-out mechanism 40 can be, for example, a plurality of internal partially reflecting surfaces that at least partially traverse waveguide 10 at an oblique angle to the direction of elongation. In other embodiments, the coupling-out mechanism can be, for example, one or more diffractive elements. In some embodiments, the faces of waveguide 10 other than the output surface may be coated with reflective coatings.

Also as in the prior art, waveguide 20 has a pair of parallel faces 22a, 22b, and a coupling-out mechanism 45, such as a plurality of partially reflecting surfaces that at least partially traverse waveguide 20 at an oblique angle to the pair of parallel faces, or one or more diffractive elements. Preferably, waveguide 10 is slightly wider than waveguide 20.

As detailed above, the optical coupling between waveguides 10 and 20 includes an air gap 29 and an interface window 30. The interface window is preferably made from a transparent optical element with a refractive index substantially the same as a refractive index of the waveguide 20. By "substantially the same" refractive index it is meant that light rays should be able to pass through the border between interface 30 and waveguide 20 substantially intact, i.e. without redirection.

The interface window 30 preferably overlaps the entire input aperture of the second waveguide 20, and in certain preferred cases projects beyond that aperture as shown in FIGS. 4A-4B, thereby enabling ray 22c to reflect out of the near eye display without entering waveguide 20. In addition, as will be detailed below with reference to FIGS. 5-6, in certain preferred embodiments the portion(s) of the interface window that project beyond the input aperture of waveguide 20 can additionally serve as structural support for additional components of the near eye display.

The minimal thickness of interface window 30 should be set so no TIR that is generated in the window side of the air-gap in the entire transmitted image field will be able to return to waveguide 20 and will exit through the side of window 30. Maximally, the thickness of the window is preferably less than a thickness of the waveguide 20 itself as measured between the major parallel faces of the waveguide. A small air gap preferably preserves TIR conditions for light propagating within the first waveguide 10. The gap may advantageously be maintained by mounting the first waveguide 10 via its end surfaces, i.e., the dimension "into the page" of the drawings as illustrated, via any suitable support structure and adhesive.

According to another embodiment of the present invention, the interface window 30 may be thicker at one end, as shown in FIG. 4B. For example, this may be necessary in cases where the design of the near eye display calls for a small angle between waveguide 10 and waveguide 20.

Figure 4C:
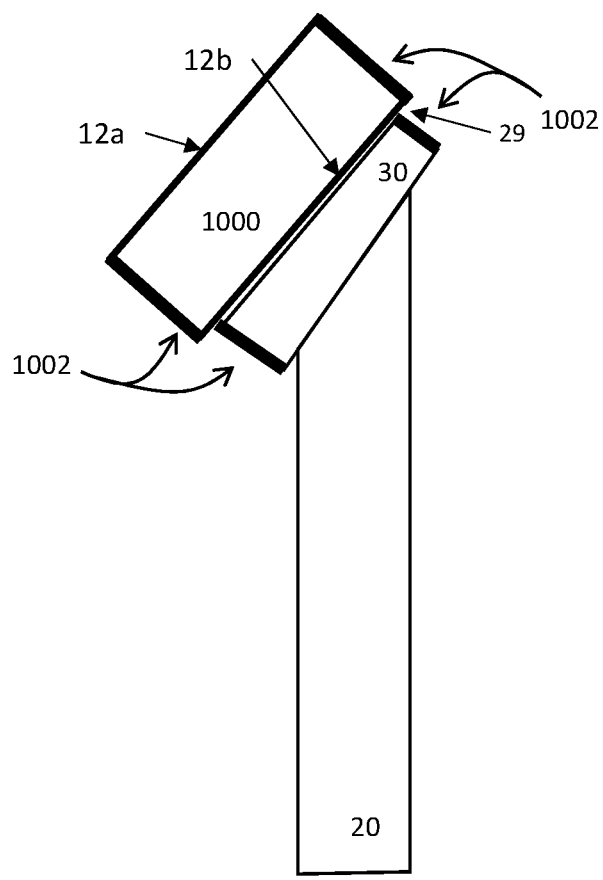
FIG. 4C illustrates a generalized schematic diagram of a near eye display according to a second embodiment of the present invention.

FIG. 4C illustrates another embodiment of a near eye display including a first 1D waveguide 1000, a second optical waveguide 20, and an optical coupling between waveguide 1000 and waveguide 20 consisting of an air gap 29 and an intermediate interface window 30. In this embodiment, waveguide 1000 is a 1D waveguide with one pair of parallel faces 12a, 12b for propagating light rays via TIR, such as the waveguides disclosed in U.S. Pat. No. 7,643,214 (in particular the embodiments shown in FIGS. 10-15, 17, 18 and 20). Similar to waveguide 10, waveguide 1000 has a direction of elongation and a coupling-out mechanism, which can be, for example, a plurality of internal partially reflecting surfaces that at least partially traverse waveguide 1000 at an oblique angle to the direction of elongation, or one or more diffractive elements.

Preferably, in this case, the ends of the waveguide 1000 (i.e. the faces perpendicular to the pair of parallel faces 21, 12b) are coated with a light absorbent coating 1002, or at least an outward transmissive coating, in order to prevent outside light from entering the waveguide. Preferably, interface window is also coated at its ends with coating 1002.

Figure 5:
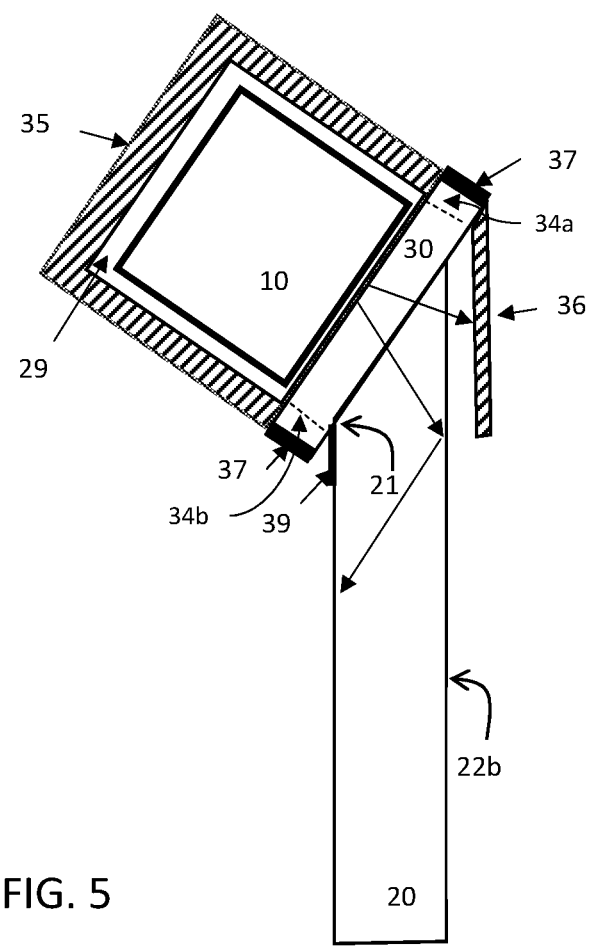
FIG. 5 illustrates a generalized schematic diagram of a near eye display according to a third embodiment of the present invention.

Another embodiment of the present invention is shown in FIG. 5, in which the interface window 30 is also used a base for securing one or more additional components to the near eye display. In this embodiment, the near eye display includes at least one light absorbent element such as cover 35 and/or baffle 36 which is secured to the interface window 30 and provides additional advantages over the near eye displays of the prior art, as will be further detailed below. It should be noted that while FIG. 5 shows a near eye display having both cover 35 and baffle 36, the near eye display can in fact include only the cover 35, only the baffle 36, or both cover 35 and baffle 36.

Baffle 36 is configured to prevent scattered light from radiating outward and preventing ambient light from being coupled in. The baffle 36 preferably extends over a portion of waveguide 20, and most preferably in a direction parallel to parallel faces 22a, 22b.

Cover 35 encapsulates waveguide 10 while preferably leaving an air gap between the cover and the faces of waveguide 10 in order to maintain TIR conditions. This cover prevents ambient light from passing through waveguide 10 onto waveguide 20 thereby causing image degradation. Preferably the cover is configured to also prevent ingress of dirt and humidity into the air-gap which would interfere with image transmission.

As detailed above, the near eye display of the present invention can in some cases include both a cover 35 and a baffle 36, in which case both elements are collectively referred to as light absorbent elements for the purposes of this description.

The end portions 34a, 34b of the interface window 30 are not used for optical transmittance or for reflectance (TIR) and can therefore be used to secure the light absorbent element(s) such as encapsulating cover 35 and/or baffle 36.

Preferably, the window 30 is coated at its end faces with a light absorbent coating 37 to further improve image transmittance.

In some embodiments, in order to improve the optical quality of the trimming point 21, a reflective coating 39 can be applied on a face of waveguide 20 at trimming point 21 as described in PCT patent publication no. WO 2018/087756.

Figure 6:
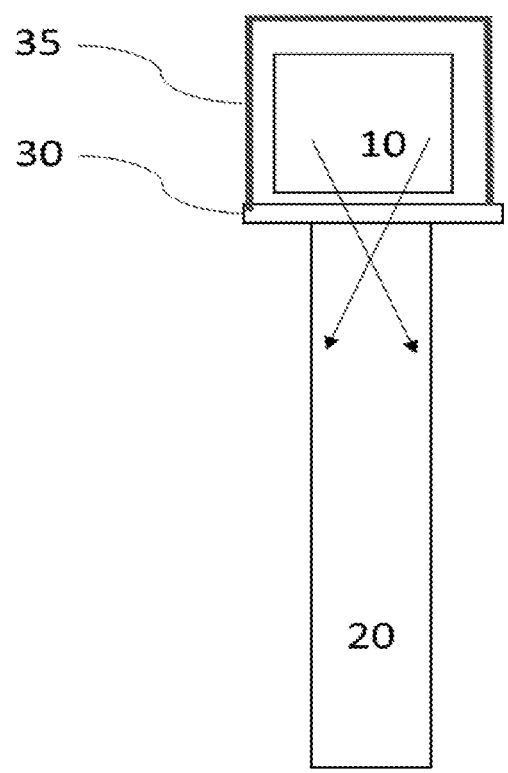
FIG. 6 illustrates a generalized schematic diagram of a near eye display according to a fourth embodiment of the present invention.

Another embodiment of the present invention is shown in FIG. 6, in which the interface window is not inclined with respect to waveguide 20 and/or wave guide 10 and is used solely a base for securing additional components to the near eye display, such as cover 35 and/or baffle 36.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

The invention claimed is:

1. A near eye display comprising:
   a first optical waveguide having a direction of elongation, at least one pair of parallel faces, and a first coupling-out mechanism;
   a second optical waveguide having an input aperture having a pair of parallel faces, and a second coupling out-mechanism;
   an optical coupling between said first optical waveguide and said second waveguide, said optical coupling including at least an air gap configured to enable total internal reflection within the first waveguide and an interface window, the interface window comprising a transparent optical element with a refractive index substantially the same as a refractive index of said second optical waveguide; and at least one light absorbent element;

wherein at least a portion of said interface window projects beyond the input aperture of said second optical waveguide and serves as a structural support for said at least one light absorbent element.

2. The near eye display of claim 1, wherein the at least one light absorbent element extends over a portion of said second optical waveguide.

3. The near eye display of claim 2, wherein the at least one light absorbent element extends over a portion of the second optical waveguide in a direction parallel to the third pair of parallel faces.

4. The near eye display of claim 2, wherein the at least one light absorbent element comprises a baffle.

5. The near eye display of claim 1, wherein the at least one light absorbent element encapsulates said first optical waveguide.

6. The near eye display of claim 5, wherein the at least one light absorbent element comprises a cover.

7. The near eye display of claim 6, wherein the cover encapsulates said first optical waveguide such that an air gap remains between the faces of said first optical waveguide and said cover.

8. The near eye display of claim 7, wherein the cover is configured to prevent ingress of dirt and humidity into the air gap.

9. The near eye display of claim 1, wherein said at least one light absorbent element comprises each of a cover encapsulating said first optical waveguide, and a baffle extending over a portion of said second optical waveguide.

10. The near eye display of claim 1, wherein the interface window is thicker at one end.

11. The near eye display of claim 1, wherein the interface window is coated with a light absorbent coating at one or both ends.

12. The near eye display of claim 1, wherein said second optical waveguide is coated with a reflective coating at a trimming point of said second optical waveguide.

13. The near eye display of claim 1, wherein the first coupling-out mechanism comprises a plurality of internal partially reflecting surfaces at least partially traversing the first optical waveguide at an oblique angle to the direction of elongation.

14. The near eye display of claim 1, wherein the first coupling-out mechanism comprises one or more diffractive elements.

15. The near eye display of claim 1, wherein the second coupling-out mechanism comprises a plurality of partially reflecting surfaces at least partially traversing the second optical waveguide at an oblique angle to the pair of parallel faces of the second optical waveguide.

16. The near eye display of claim 1, wherein the second coupling-out mechanism comprises one or more diffractive elements.

17. A near eye display comprising:

a first optical waveguide having a direction of elongation, at least one pair of parallel faces, and a first coupling-out mechanism;

a second optical waveguide having an input aperture, a pair of parallel faces, and a second coupling out-mechanism;

an optical coupling between said first optical waveguide and said second waveguide, said optical coupling including at least an air gap configured to enable total internal reflection within the first waveguide, and an interface window, the interface window comprising a transparent optical element with a refractive index substantially the same as a refractive index of said second optical waveguide; and wherein at least a portion of said interface window projects beyond the input aperture of said second optical waveguide such that undesired light exiting the first waveguide is prevented from entering the second waveguide.

* * * * *